United States Patent Office 2,797,230
Patented June 25, 1957

2,797,230
PROCESS FOR PREPARING 17α-HYDROXY 17-BROMOACETYL STEROIDS

Ralph John Nicholls, London, England, assignor to G. N. R. D. Patent Holdings Limited, London, England, a British company No Drawing. Application December 14, 1954, Serial No. 475,270

Claims priority, application Great Britain December 31, 1953

6 Claims. (Cl. 260—397.45)

The present invention is concerned with improvements in or relating to the preparation of steroid compounds of the general formula

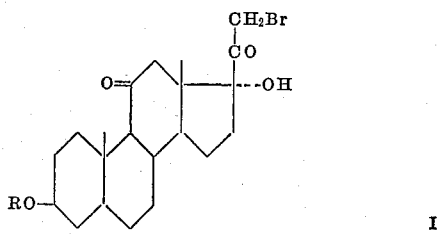

I where R is an acyl group, for example an acetyl, propionyl or benzoyl group.

As will be more fully explained below the side-chain in the 17-position of the above compounds of formula I may be readily converted into the $C_{17}$ side-chain occurring in cortisone and the presence of the esterified 3-hydroxyl group in the above compounds enables the 3-keto-$\Delta^4$-system occurring in cortisone to be readily introduced. The above compounds of Formula I are therefore valuable intermediates in the synthesis of cortisone and related compounds.

It has previously been proposed to prepare compounds similar to those of Formula I above but in which a hydroxyl group is present in the 3-position by the following series of reactions:

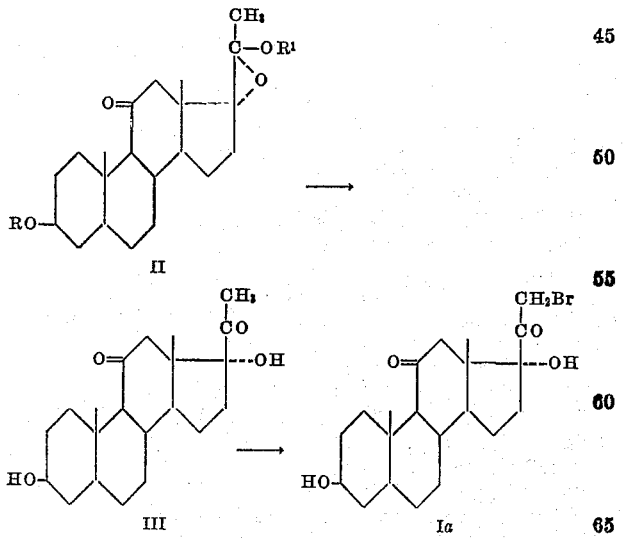

where R and $R^1$ are acyl groups.

The first stage of the above sequence of reactions, that is the formation of the compound of Formula III from those of Formula II is carried out by hydrolysing the latter with, for example, an alkali such as caustic potash and the second stage, that is the formation of the compound of Formula Ia above, by treating the compound of Formula III with bromine in an inert organic solvent. These and similar reactions have been described by several authors (see, for example, Kritchevsky, Garmaise and Gallagher, J. A. C. S. 1952, 74, 483; Pataki, Rosenkranz and Djerassi, J. A. C. S. 1952, 74, 5615 and U. S. Specification 2,596,562). However the second stage of the above sequence of reactions, namely the bromination reaction introduces certain difficulties in that some measure of additional bromination occurs at the 21- or other positions; furthermore the hydrogen bromide evolved during the bromination may cause rearrangement of the products.

We have now unexpectedly found that the compounds of Formula I above can conveniently be obtained by the direct bromination of the oxides of Formula II above. Whilst we do not wish to be limited by a theoretical explanation, we believe that the action of the bromine is initially to substitute in the 21-position, the hydrogen bromide evolved being taken up by the oxide bridge which is opened with formation of the 17α-hydroxyl group; hydrogen bromide is therefore, we believe, not so freely available to bring about rearrangements as in the prior bromination process referred to above. At the same time, hydrolysis of the 20-ester group takes place. A further advantage of this new process lies in the fact that whereas the 17-hydroxyl compound (Formula III above) and its bromination product (Formula Ia above) are extremely insoluble in most organic solvents (necessitating bromination in suspension), the oxides of Formula II above and the products of our new process, that is the compounds of Formula I above, have a considerable solubility in suitable bromination solvents, such as chloroform, thus enabling the bromination to be carried out under homogeneous conditions. The bromination is therefore more easily controlled in our new process than in the previously proposed bromination referred to above.

According to the present invention, therefore, we provide a process for the preparation of compounds of the general formula

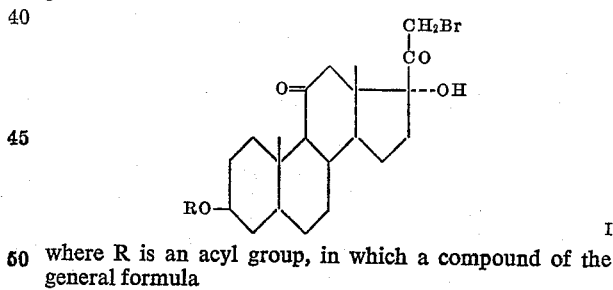

I where R is an acyl group, in which a compound of the general formula

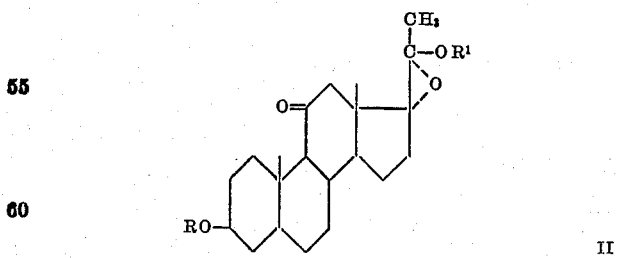

II where $R^1$ is an acyl group is reacted with bromine in the presence of an inert organic solvent.

According to a feature of the present invention, R is an acetyl, propionyl or benzoyl group.

According to a further feature of the present invention, the bromination is carried out under homogeneous conditions.

The organic solvents which may be used in the process according to the invention are those in which both the starting material and the product are substantially soluble and which are substantially inert under the bromination conditions employed; an example of such a solvent is chloroform. The process according to the invention is preferably carried out at a temperature above 0° C., as below this temperature it will proceed sluggishly; and below 45° C., as side reactions or rearrangements may assume increasing proportions above this temperature. Furthermore we prefer to use equimolecular proportions of bromine and steroid starting material in the process according to the invention.

It has previously been proposed to convert the compound of Formula Ia above into compounds of the general formula

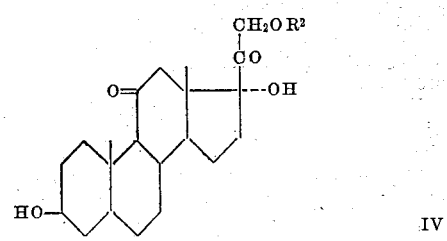

where $R^2$ is an acyl group, by treating them with an alkali metal salt of the acid $R^2$—OH in a suitable solvent, such as acetone, and this process can be applied to the compounds of Formula I above obtained by the process according to the invention in order to obtain compounds similar to those of Formula IV above, but in which both the 3- and 21-positions are esterified.

However compounds of Formula IV above are of greater utility as intermediates in the synthesis of cortisone than similar compounds in which the 3-hydroxyl group is also esterified as the introduction of the 3-keto-$\Delta^4$-system occurring in cortisone is advantageously carried out on compounds containing a 3-hydroxy group. For this reason, when using the present process in the synthesis of cortisone it is normally preferable to carry out an acid hydrolysis, for example with hydrogen bromide, by means of which the 3-ester group of the products of the process according to the invention is hydrolysed, prior to conversion of the 21-bromo group to an acyloxy group.

It will be appreciated that the 21-ester group in the compounds of Formula IV above and 3-esters thereof can be readily hydrolysed, so that the $C_{17}$ side-chain occurring in cortisone may be obtained.

The conversion of the 21-bromo group to an acyloxy group may be applied to the crude product obtained by the process according to the invention, that is the crude product obtained by the bromination of the oxides of Formula II above, where it is desired to obtain 3:21-diesters or may be applied to the product obtained by said acid hydrolysis where it is desired to obtain 3-hydroxy-21-esters. Suitable solvents for such an esterification process are those which do not react preferentially with the compounds of Formula I above or the corresponding 3-hydroxyl compound; such solvents are well known in the art and examples thereof are acetone and methyl alcohol.

This reaction is preferably carried out at temperatures above room temperature and at or below the boiling point of the solvent used.

The starting materials for the process according to the invention, namely the oxides of Formula II above may be prepared in any convenient manner for example as described in copending application Ser. No. 361,814.

In order that the invention may be well understood the following examples are given by way of illustration only:

*Example 1*

$3\beta$:20-diacetoxy-11-oxo-17:20 - oxidoallopregnane (10 g.) is dissolved in chloroform (100 ml.), two drops of hydrogen bromide in chloroform (6% w./v.) are added and the solution is treated with a 0.95 N solution of bromine in chloroform (51 ml., 1.05 moles). The bromine solution is added dropwise over a period of 10–15 minutes, and it is found that after an initial induction period, the bromine is decolourised as fast as it is added.

The clear solution is evaporated to dryness in vacuo, the residual gum is dissolved in dry acetone (250 ml.) and the solution is refluxed for 30 minutes with anhydrous potassium acetate (15 g.). The inorganic salts are filtered off, and the solution is evaporated almost to dryness in vacuo. Water is added to a total volume of 1 litre. The precipitated solid is collected, water washed and vacuum dried at 100° C. Yield 10.35 g., M. P. 185–192°.

Crystallisation from methanol affords $3\beta$:21-diacetoxy-17$\alpha$-hydroxy-11:20-dioxoallopregnane, M. P. 216–219° C., $[\alpha]_D$ +71.5° (c.=1% in dioxan) (6.6 g., 59% of the theoretical yield).

*Example 2*

$3\beta$:20-diacetoxy-11-oxo-17:20 - oxidoallopregnane (10 g.) is dissolved in chloroform (100 ml.), three drops of hydrogen bromide in chloroform (6% w./v.) are added and the solution is treated with a 0.69 N solution of bromine in chloroform (69.5 ml., 1.04 moles). The bromine solution is added dropwise over a period of 10–15 minutes, and it is found that after an initial induction period, the bromine is decolourised as fast as it is added.

On completion of the bromination, methanol (50 ml.) and a solution of hydrogen bromide in chloroform (5 ml., containing 0.3 g. HBr) is added and the solution is allowed to stand at room temperature for 40 hours. The clear solution is evaporated to dryness in vacuo, and the residual gum is triturated with ether (50 ml.). The white solid is collected by filtration, is washed with ether and is air dried. Yield 6.75 g., M. P. 227–231° (dec.).

The total solid is suspended in acetone (100 ml.), dry potassium acetate (10 g.) is added and the mixture is refluxed for 30 minutes. The inorganic salts are filtered off and the solution is evaporated almost to dryness. Addition of water precipitates a white solid which is collected, water washed and dried at 100° C. in vacuo. Yield 5.7 g., M. P. 215–225°.

The total solid is then refluxed for 30 minutes with Girard "P" reagent (2 g.) in methanol (50 ml.) and glacial acetic acid (2.5 ml.). After cooling the mixture and allowing it to stand in the refrigerator for 24 hours, the crystalline solid is collected, washed with a little methanol and is dried at 100° in vacuo. There is obtained in this way 21-acetoxy-$3\beta$:17$\alpha$-dihydroxy-11:20-dioxoallopregnane, M. P. 229–232° C. $[\alpha]^{20}_D$ +65° (c.=0.8 in acetone) (4.45 g., 47% of the theoretical yield).

*Example 3*

$3\beta$:20-diacetoxy-11-oxo-17:20-oxidoallopregnane (2 g.) is dissolved in chloroform (25 ml.) and the solution is treated at room temperature with a 0.38 N solution of bromine in chloroform. The bromine solution is added dropwise over a period of 10–15 minutes, and it is found that after an initial induction period, the bromine is decolourised as fast as it is added. In all, 12.2 ml. of the bromine solution are added, representing 1 atom of bromine per mole of sterol.

The clear solution is evaporated to dryness in vacuo, the residual gum is dissolved in dry acetone (50 ml.) and the solution refluxed for 30 minutes with anhydrous potassium acetate (3 g.). The inorganic salts are filtered off, and the solution is evaporated to dryness in vacuo. The residue of crude acetates is dissolved in methyl alcohol (30 mls.) and allowed to crystallise at 0° C. There is obtained in this way $3\beta$:21-diacetoxy-17$\alpha$-hydroxy-11:20-dioxoallopregnane, M. P. 204–208° C., $[\alpha]^{20}_D$ +71.0° (c.=1% in dioxan) (0.94 g., 45% of the theoretical yield) which on recrystallisation has M. P. 220° C., $[\alpha]^{20}_D$ +72.9° (c.=1% in dioxan), found C, 67.0%; H, 7.88%. $C_{25}H_{35}O_7$ requires C, 67.2%; H, 7.84%.

Whilst we have illustrated the application of the process according to the invention to the compound in which the 3-ester group is an acetoxy group, it will be apparent that it may equally be applied to other esters, such as propionyloxy and benzoyloxy compounds.

I claim:
1. A process for the preparation of compounds of the general formula

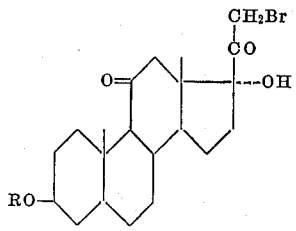

where R is an acyl group derived from a carboxylic acid selected from the group consisting of lower alkyl carboxylic acids and benzoic acid, in which a compound of the general formula

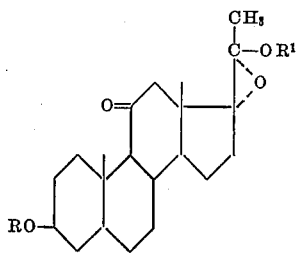

where $R^1$ is an acyl group derived from a lower alkyl carboxylic acid, is reacted with bromine in the presence of an inert organic solvent.

2. A process as claimed in claim 1, in which the inert organic solvent is chloroform.

3. A process as claimed in claim 1, in which the reaction is carried out at a temperature between 0° and 45° C.

4. A process as claimed in claim 1, in which approximately one molecular proportion of bromine is used per molecular proportion of steroid starting material.

5. A process as claimed in claim 1, in which the reaction is carried out under homogeneous conditions.

6. A process for the preparation of 3β-acetoxy-17α-hydroxy-21 bromo-11:20-dioxoallopregnane which comprises reacting 3β:20-diacetoxy-11-oxo-17:20-oxidoallopregnane with approximately 1 molecular proportion of bromine in an inert organic solvent under homogeneous conditions.

References Cited in the file of this patent

Tishler: Jour. Am. Chem. Soc. 73, 4052–53 (1951).
Rosenkranz: Jour. Am. Chem. Soc. 73, 4055–56 (1951).